US012665324B2

(12) United States Patent
Zenker

(10) Patent No.: US 12,665,324 B2
(45) Date of Patent: Jun. 23, 2026

(54) ELECTRICAL CONNECTOR

(71) Applicant: HARTING AG, Biel (CH)

(72) Inventor: Matthias Zenker, Port (CH)

(73) Assignee: Harting AG, Biel (CH)

( * ) Notice: Subject to any disclaimer, the term of this patent is extended or adjusted under 35 U.S.C. 154(b) by 299 days.

(21) Appl. No.: 18/567,707

(22) PCT Filed: May 18, 2022

(86) PCT No.: PCT/EP2022/063434
§ 371 (c)(1),
(2) Date: Dec. 6, 2023

(87) PCT Pub. No.: WO2022/258328
PCT Pub. Date: Dec. 15, 2022

(65) Prior Publication Data

US 2024/0283171 A1 Aug. 22, 2024

(30) Foreign Application Priority Data

Jun. 7, 2021 (CH) .................................... 00664/21

(51) Int. Cl.
*H01R 4/28* (2006.01)
*H01R 13/436* (2006.01)
*H01R 13/50* (2006.01)

(52) U.S. Cl.
CPC ............. *H01R 4/28* (2013.01); *H01R 13/436* (2013.01); *H01R 13/501* (2013.01)

(58) Field of Classification Search
CPC ...... H01R 4/28; H01R 4/5008; H01R 13/436; H01R 13/501

(Continued)

(56) References Cited

U.S. PATENT DOCUMENTS 3,309,645 A * 3/1967 Noschese ................. H01R 4/26 439/864
3,328,747 A * 6/1967 Dover .................. H01R 4/5008 439/409

(Continued)

FOREIGN PATENT DOCUMENTS

DE 29605034 U1 5/1996
DE 19823509 C1 11/1999
WO WO 2012175184 A1 12/2012

OTHER PUBLICATIONS

International Search Report and Written Opinion, mailed Sep. 21, 2022, for International Patent Application No. PCT/EP2022/063434. (13 pages) (with English translation of International Search Report).

*Primary Examiner* — Gary F Paumen
(74) *Attorney, Agent, or Firm* — Seed Intellectual Property Law Group LLP

(57) ABSTRACT

An electrical connector is provided for a wire having a wire end, wherein an uninsulated wire segment extending out of the wire end and an insulated wire segment adjoining the uninsulated wire segment together form an insertion section. The electrical connector comprises a connector body, the connector body having a channel for receiving the insertion section. The connector further comprises an electrical connection element, wherein the electrical connection element has a wire contact area, arranged in the channel, for making contact with the uninsulated wire segment and a connection area arranged on the outside of the connector body, wherein the electrical connection element is formed by metallization, in particular a partial metallization, of the connector body. The electrical connector further comprises a cover element, the cover element having a clamping structure. The clamping structure does not project into the channel in an open configuration and projects into the channel from the open (Continued)

channel top side in a closed configuration. The clamping structure is configured to clamp, in the closed configuration, the insertion section between the channel base and the clamping structure and to keep the uninsulated wire segment in contact with the wire contact area.

19 Claims, 4 Drawing Sheets

(58) Field of Classification Search
USPC .................................................. 439/345, 864
See application file for complete search history.

(56) References Cited

U.S. PATENT DOCUMENTS

| | | | | | |
|---|---|---|---|---|---|
| 3,999,829 | A * | 12/1976 | Glaesel | H01R 9/26 | 439/864 |
| 4,759,726 | A * | 7/1988 | Naylor | H01R 4/5008 | 439/441 |
| 5,281,164 | A * | 1/1994 | Gan | H01R 4/5008 | 439/409 |
| 5,624,286 | A * | 4/1997 | Marco | B29D 30/247 | 439/864 |
| 6,019,647 | A * | 2/2000 | Trudel | H01H 71/08 | 439/864 |
| 9,543,668 | B2 * | 1/2017 | Wendt | H01R 4/5008 | |
| 2004/0072461 | A1 * | 4/2004 | Matsuda | H01R 4/5008 | 439/329 |

* cited by examiner

ELECTRICAL CONNECTOR

BACKGROUND

Technical Field

The present disclosure relates to electrical connectors for electrically connecting wires to an electric circuit, printed circuit board, or assembly. The disclosure also relates to a method for electrically connecting a wire.

Description of the Related Art

The object of electrically connecting wires to a circuit, printed circuit board, assembly, or the like has many different manifestations in many fields of electrical engineering. Other requirements in addition to electrical and mechanical reliability during operation are in principle a desired simple establishment and optional release of the connection, error-free handling, and low costs both for the components used and for carrying out the mounting. There are often further requirements because of boundary conditions such as confined spatial conditions and a restricted view.

It is particularly critical and difficult to meet these and possibly other requirements during use in the field, for example when installing electrical systems and maintaining and repairing them. One-handed working is thus sometimes required because of the spatial conditions.

BRIEF SUMMARY

Embodiments of the present disclosure provide an electrical connector for a wire with a wire end. An uninsulated wire segment and an insulated wire segment adjoining the uninsulated end segment extend from the wire end. The uninsulated and the insulated wire segment together form a lead-in section. The wire thus has no insulation at a section which extends as far as the wire end and forms the uninsulated wire segment. The uninsulated wire segment is here typically produced by removing an originally existing insulation or by stripping. In the direction facing away from the wire end, the wire can also be insulated following the insulated wire segment of the lead-in section, or the insulated wire can represent an end region of an insulated part of the wire. This insulated part of the wire can in principle have any desired length.

The electrical connector can be transferred from an open configuration into a closed configuration. In one embodiment, the connector may also be transferred from the closed configuration into the open configuration non-destructively.

The connector has a connector body with a proximal and a distal connector body side and a connector body top side. The connector body moreover has a channel for receiving the lead-in section. The channel extends in the connector body along a channel axis from a proximal channel end in a distal direction, wherein the proximal channel end opens out into the proximal connector body side. The channel moreover has a channel top side open toward the connector body top side, and a channel bottom. The channel depth refers to a distance from the connector body top side to the channel bottom and the channel width to a distance between the channel side faces which, together with the channel bottom, delimit the open channel. Both the channel depth and the channel width are not necessarily constant over the channel length or along the channel axis. A direction transverse, in particular perpendicular, to the channel axis which extends between the open channel top side and the channel bottom is referred to as the depth direction and a corresponding axis as the depth axis. A direction transverse, in particular perpendicular, to the channel axis and to the depth axis is referred to as the lateral direction, and a corresponding axis as the lateral axis. The lateral axis extends between the channel side faces which connect the open channel top side to the channel bottom. A view along the depth axis in the direction from the channel top side to the channel bottom is referred to as a top view, and a view along the channel axis from proximal to distal is referred to as a front view.

The connector body is formed from electrically insulating material, in particular plastic.

The channel may have, perpendicular to the channel axis, a, for example, essentially U-shaped cross-section which is delimited by the channel side faces as delimitations in the lateral direction or legs of the U-shape and by the channel bottom as the base of the U-shape. In one embodiment, the channel side faces may be essentially parallel to each other or partially parallel to each other in the case of a varying channel width. The channel bottom can be interrupted or have openings leading to a connector body underside. Likewise, the channel side faces can have interruptions or cutouts which connect the channel interior to lateral connector body sides which delimit the electrical connector in the lateral direction and can define its lateral outer faces. Those parts of the connector body which extend between the channel and the lateral connector body sides are referred to as connector body side walls and a part of the connector body extending between the channel bottom and the connector body underside is referred to as the connector body base.

The channel side faces and the channel bottom can meet at a sharp angle, for example at right angles. The transition region may, however, also have a continuous transition with a curvature.

In a further embodiment, the channel bottom may have a V-shaped form in cross-section and then may have, in the lateral direction, in each case one section on both sides of the channel axis, which sections meet at an angle and moreover meet the respective adjoining channel side face at an angle. Such an embodiment is advantageous in order to ensure a secure contact even when, after a prolonged period of time in the closed configuration, the metallization of the wire contact surface degenerates because of the flowing of the material of the connector body or works into the material of the connector body because of this flow. In one embodiment, the cross-section of the channel may overall have a V-shaped or alternatively parabolic form as far as the open channel top side on a part of or its whole length. In such an embodiment, there is no explicit separation between the channel bottom, on the one hand, and the channel side faces, on the other hand.

The electrical connector moreover has an electrical connection element. The electrical connection element has a wire contact surface arranged in the channel for the purpose of contacting the uninsulated wire segment and an electrical connection surface arranged on the outside of the connector body. The electrical connection element is formed by metallization, in particular a partial metallization, of the connector body.

The electrical connector moreover has a cover element. The cover element has a clamping structure, wherein the clamping structure does not project into the channel in the open configuration of the electrical connector and projects into the channel from the open channel top side in the closed configuration of the electrical connector. The cover element can have a cover element base from which the clamping structure protrudes.

The clamping structure is designed to clamp the lead-in section between the channel bottom and the clamping structure in the closed configuration and to hold the uninsulated wire segment in contact with the wire contact surface. The clamping can here take place essentially over the whole length of the uninsulated wire segment or over a part thereof and/or in a number of sections along the extent of the uninsulated wire segment. The clamping may optionally, additionally, take place over the whole length of the insulated wire segment or over a part thereof and/or in a number of sections along the extent of the insulated wire segment.

In the closed configuration, in one embodiment, the cover element covers the channel or the open channel top side completely or partially.

It should be pointed out that directional terms such as "top side", "underside", "above", "below", "front", "back", "left", "right", etc., unless otherwise mentioned, in principle serve only to describe the geometrical characteristics of the electrical connector and/or elements which are associated with the electrical connector but do not imply any specific position or orientation in the assembled state or a particular installed position. These can in principle be chosen as desired.

Some embodiments include a connector/wire arrangement. The connector/wire arrangement includes an electrical connector according to one of the embodiments described above and/or below, and a wire with a wire end, where an uninsulated wire segment extending from the wire end, and an insulated wire segment adjoining the uninsulated end segment, together form a lead-in section, wherein the lead-in section is received in the channel.

Some embodiments include a method for electrically connecting a wire. The method includes providing an electrical connector according to one of the embodiments described above and/or below in the open configuration. The method further includes providing a wire with a wire end, where an uninsulated wire segment extending from the wire end and an insulated wire segment adjoining the uninsulated segment together form a lead-in section. The method further includes transferring the electrical connector from the open configuration into the closed configuration, as a result of which the lead-in section is inserted into the channel and clamped between the clamping structure and the channel bottom and the uninsulated wire segment is brought into contact with the wire contact surface. After the method has been performed, the electrical connector and the wire together form a connector/wire arrangement as described above. When the electrical connector is transferred from the open into the closed configuration, deformation of the lead-in section can take place because of the contact of the lead-in section with the cover element, in particular the clamping structure, and with the connector body, in particular the channel bottom. The wire or its lead-in section is typically provided in an essentially straight original shape and the deformation of the lead-in section typically takes place in a plane in which the channel axis and a cover element axis lie as described below or in a plane perpendicular to the lateral direction.

Advantageous embodiments of the method can be found in the following description and the Figures. In particular, specific embodiments of the electrical connector disclose at the same time corresponding embodiments of the method described herein.

An electrical connector described herein can be produced cost-effectively and in large quantities. A high degree of reliability can here be obtained at the same time during use. Both a secure mechanical and electrical connection between the wire, on the one hand, and the connector, on the other hand, is moreover carried out in a single step or by a single movement by transferring the electrical connector from the open into the closed configuration.

Providing the wire and closing the connector or transferring it from the open into the closed configuration can take place manually, wherein, in a typical embodiment, no further tool is needed. An electrical connector described herein is consequently suited in particular for use in the field. Alternatively or optionally, however, complete or partial automation may also be provided.

The electrical connector as a whole or at least the connector body can, together with the electrical connection element, be produced as a molded interconnect device (MID) or be an MID component. In principle, the connector body and/or the cover element may also be manufactured using other methods, for example by machining and/or by additive manufacturing methods such as, for example, 3D printing. Suitable materials are, for example, amorphous or semicrystalline thermoplastics such as PC-ABS, PPA, LCP, or PEEK. Moreover, thermosetting plastics, for example based on phenolic resin or light-curing, and/or ceramics can be used.

The metallization can have a different structure depending on requirements and the material of the connector body and can have a single layer or multiple layers. A layer structure which is fundamentally well suited has, for example, three layers and has a layer sequence copper (Cu)-nickel (Ni)-gold (Au).

Depending on the embodiment, the electrical connector and in particular the connector body may be designed for mounting on a printed circuit board (PCB). For this purpose, the electrical connection surface can be appropriately designed for electrical contacting and moreover a corresponding mechanical interface can be provided on the connector body. Furthermore, the electrical connector may additionally or alternatively be designed for mounting on an electrical/electronic appliance or an assembly. The electrical connector, in particular the connector body, may be integral with an electrical/electronic appliance or assembly and form a part thereof. The electrical connector and in particular the connector body itself may be an integral part of an MID component or MID assembly.

In the case of an embodiment as a separate component, the connector and in particular the connector body may be implemented as an elongated element, the longitudinal extent of which extends along the channel axis. The total length between the proximal connector body side and the distal connector body side is here typically given by the length of the channel between the proximal channel end and a distal channel end or is slightly longer than this.

In a direction of view along the channel axis, the connector body can have, for example, an essentially square or rectangular cross-section. The channel can here typically run symmetrically between the lateral connector body sides. The channel axis can at the same time represent a connector body axis.

The connector body can have an essentially smooth connector body underside which can run, for example, parallel to the connector body top side. The connector body underside can be designed, for example, for mounting on a printed circuit board. The connector body underside can optionally carry the connection surface. In such an embodiment, the connector may be designed, for example, for surface mounting as an SMD (surface-mounted device).

The channel is typically open in the longitudinal direction, i.e., along the channel axis, to the proximal connector body side or opens into the latter, whilst a distal channel end is closed or ends in the connector body. In principle, the channel may, however, also be open to the distal connector body side and thus be continuous.

In one embodiment, in a direction of view along the channel axis or connector body axis the lateral connector body sides may be parallel to each other and essentially smooth. This is provided, for example, for a square or rectangular cross-section as described above. Such an embodiment enables a plurality of connectors to be arranged in a row, wherein the connector body axes and hence the channel axes of the individual connectors are parallel to one another. Optionally, the lateral connector body sides may include orienting and/or coupling structures for the mutual orientation and connection of a plurality of connectors or connector bodies. Such orienting and/or coupling structures may contain concave and convex elements provided for reciprocal engagement such as protruding lugs, pins, or bulges as convex elements, and corresponding recesses, grooves, depressions, or blind holes as concave elements. Tongue-and-groove elements are, for example, also possible. Such a coupling structure may also include locking elements for mutual locking such as, for example, snap elements. A plurality of connector bodies and/or cover elements may be manufactured as a single piece with one another and thus form an electrical multiple connector. In such an embodiment, the connector body side walls of the individual connectors of the multiple connector may be formed as integral with one another or merge into one another.

The cover element can have a proximal and a distal cover element side in a similar way to the connector body. The length of the cover element can here correspond at least essentially to the length of the connector body, or the spacing between the proximal cover element side and the distal cover element side can correspond to the spacing between the proximal connector body side and the distal connector body side. Likewise, a lateral extent of the cover can correspond essentially to that of the connector body. In a top view, the connector body and the cover element can be at least essentially congruent.

The clamping structure typically extends along a cover element axis which can run in the closed configuration parallel to the channel axis or to the connector body axis. The clamping structure can here be formed by one or more convex elements such as pins, lugs, and/or curved segments as described below which may be arranged one behind the other and spaced apart from one another or immediately adjacent to one another along the cover element axis. In one embodiment, the clamping structure may be formed by a web protruding from a cover element base and which varies in its height and its spacing from the cover element base surface along the cover element axis.

In one embodiment, the connector body and the cover element may be formed as a single piece. In such an embodiment, the electrical connector can as a whole be implemented as a one-piece element, in particular a one-piece injection-molded element with a partial metallization for the electrical connection element. Alternatively, the cover element may, however, also be implemented as a separate component.

In principle, the same materials and manufacturing method as for the connector body are suited for the cover element. The cover element is, like the connector body, typically made from an electrically insulating material.

In one embodiment, the connector body and the cover element may be connected by a hinge, wherein the hinge pivotably connects the distal connector body side and a distal cover element side. In the case of a one-piece embodiment of the connector body and the cover element, the hinge may be implemented in particular as a film or foil hinge. In an alternative embodiment, the hinge may, however, also have a two-part design, wherein in each case one hinge part is part of the connector body or the cover element and can in each case be formed as a single piece with the latter or molded thereon.

The hinge axis typically runs transversely to the channel or in the lateral direction. In such an embodiment, the connector body and the cover element are connected at their respective distal sides in the open configuration and open from there toward their opposite proximal sides such that the cover element protrudes at an angle from the connector body. In the case of transfer into the closed configuration, the cover element is pivoted about the hinge axis with respect to the connector body. In the closed configuration as the final state, a peripheral region of the cover element which completely or partially surrounds the clamping structure can lie on the connector body top side.

In one embodiment, the electrical connector includes a latching device. The latching device here includes a connector-body latching structure arranged on the connector body a cover-element latching structure arranged on the cover element. The connector-body and cover-element latching structure are designed to lock in latching fashion, in particular detachable latching fashion, the connector body and the cover element by positive engagement of the connector-body and cover-element latching structures.

The connector-body latching structure and the cover-element latching structure can in particular each be arranged in a proximal region of the connector body and cover element, respectively, and can each be molded as a single piece on the connector body and cover element, respectively. One of the two latching structures, in particular the cover-element latching structure, can be implemented by one or more convex structure elements such as elastically resilient hooks or lugs, pins or catches. Correspondingly, the other latching structure, in particular the connector-body latching structure, can be formed by corresponding concave structure elements such as recesses or perforations into which the convex structure elements each engage in latching fashion for locking purposes. The connector-body latching structure can be arranged, for example, through recesses in the channel side faces situated opposite each other. At least one of the latching structures, for example the cover-element latching structure, can be elastically resilient, in particular in the lateral direction. The connector-body latching structure may, in one embodiment, be arranged on both sides of the channel axis or connector body axis or in each case have a part on each side of the channel axis or connector body axis. Correspondingly, the cover-element latching structure may be arranged on both sides of the cover element axis or in each case have a part on each side of the cover element axis.

The latching device locks or latches in place when the cover element reaches its end position during the transfer from the open into the closed configuration. It is consequently ensured that the closed configuration is maintained and the clamping of the lead-in section, in particular of the uninsulated wire segment, is maintained, and the uninsulated wire segment with the wire contact surface is held in secure electrical contact. The latching device moreover prevents unintentional opening of the connector because of elastic forces exerted by the uninsulated wire segment, as described below.

As an alternative or in addition to a latching device of the electrical connector, the connector body and the cover element may, however, also be held in the closed configuration by a separate device which is itself not part of the electrical connector, for example a clamping device.

In the case of a design with strain relief as described below, the connector-body latching structure may, for example, adjoin the connector-body strain relief structure in the distal direction. The cover-element latching structure can correspondingly adjoin a cover-element strain relief structure in the distal direction.

In one embodiment, the electrical connector may have a wire stop for axially positioning and fixing the lead-in section of the wire with respect to the electrical connector. The wire stop can have a stop for an end face of an insulation of the insulated wire segment at the transition to the uninsulated wire segment or be formed by the latter. The wire stop here has a wire passage which has a width or extent in a direction transverse to the wire axis or in the lateral direction, said width or extent corresponding to the diameter of the uninsulated wire segment, i.e., the wire with no insulation, or advantageously being slightly greater than it but less than the diameter of the insulated wire segment.

In one embodiment, the wire stop may be arranged on the cover element and can in particular be part of the cover element. The wire stop can be integral with a cover-element latching structure or a cover-element latching structure can serve at the same time as a wire stop. For this purpose, the cover-element latching structure can in each case have a hook or catch element on both sides of the cover element axis, as described above. A clearance between the hook or catch elements is here dimensioned such that the uninsulated wire segment fits between them, whilst the end face of the insulation abuts the hook or catch elements, in particular their proximal end sides. In further embodiments, the wire stop may, however, also be implemented differently, for example by correspondingly spaced-apart webs or pins on both sides of the cover element axis. Additionally or alternatively, an end socket as described below may serve as a wire stop.

In one embodiment, the channel bottom and the clamping structure are designed to deform the uninsulated wire segment during the transfer from the open configuration into the closed configuration. For this purpose, the channel depth can vary along the channel axis or the channel bottom can have a spacing from the channel top side which varies along the channel axis in the depth direction. As a result, during the transfer from the open into the closed configuration, a deformation, corresponding to the channel bottom, of the uninsulated wire segment is caused. The deformation here takes place in the direction of the channel depth or in a plane defined by the channel axis and the cover element axis, for example, without or with a slight or negligible deformation in the lateral direction. Optionally, however, a lateral deformation may also take place in order to increase the contact surface area or increase the contact security. Such an embodiment is advantageous in terms of contact security and the larger contact surface area, compared with a straight extent, between the wire and the wire contact surface.

Depending on the configuration and material properties of the wire, the deformation of the wire can take place entirely or essentially plastically, or may be semielastic. A semielastic deformation causes the wire or the uninsulated wire segment to have an elastic residual tension in the closed configuration. This increases the contact pressure between the uninsulated wire segment, on the one hand, and the wire contact surface, on the other hand. The elastic residual tension moreover causes the contact also to be maintained when, after a relatively long period of time in the closed configuration, the metallization of the wire contact surface degenerates because of the flow of the material of the connector body.

In one embodiment, the channel bottom of the clamping structure may be designed to form a number of curved sections in the uninsulated wire segment along the channel axis. For this purpose, in particular, the channel depth can designed as curved in some places along the channel axis. In at least one embodiment, the curved sections may be designed as, for example, in the shape in side view of an arc of a circle, for example as semicircular, or as a parabole or elliptical. In one embodiment, two or more such curved sections may be arranged one behind the other, wherein the curved sections immediately adjoin one another or are, for example, each separated from one another by straight or bent sections.

In one embodiment, the connector body may have a mating clamping structure, wherein, in the closed configuration, the clamping structure and the mating clamping structure engage in each other and in particular, hold and clamp the uninsulated wire segment between them. The mating clamping structure is here formed by the channel bottom, wherein the channel depth varies along the channel axis. During the closing of the connector or the transfer from the open configuration into the closed configuration, the uninsulated wire segment is deformed or bent in accordance with the shape of the clamping structure and the mating clamping structure or channel bottom. In one embodiment, the clamping structure and the mating clamping structure each comprise mutually complementary curved segments as described above.

In one embodiment, the wire contact surface runs at least partially on the channel bottom. The channel bottom is here correspondingly metallized. In such an embodiment, the uninsulated wire segment may be pressed in the closed configuration by the cover element or the clamping structure securely against the wire contact surface. Such an embodiment is advantageous in conjunction with a device as described above which, in the latched-in or locked state, ensures the contact pressure between the uninsulated wire segment and the wire contact surface. In further embodiments, the wire contact surface may run completely or partially on the channel side faces.

In one embodiment, the wire contact surface may include a plurality of contact surface segments which are electrically connected to one another by a connecting conductor of the metallization. The contact surface segments can here be arranged, for example, on curved segments, in particular curved segments of a mating clamping structure as described above. The connecting conductor can itself have a multi-part design and in each case connect adjacent contact surface segments or contact surface segments arranged one behind the other along the channel axis. The connecting conductor can run in particular on the channel side faces and/or on the connector body top side, for example on both sides of the channel axis or connector body axis.

In one embodiment, the electrical connector may have a strain relief. The strain relief structure can be arranged in particular in a proximal region and is designed to clamp the insulated wire segment in the closed configuration. To do this, the connector body can have a connector-body strain relief structure and the cover element a cover-element strain relief structure. The connector-body and the cover-element strain relief structures are designed to hold and clamp the insulation of the insulated wire segment between them in the closed configuration. In one embodiment, the connector-body strain relief structure and the cover-element strain relief structure may be complementary with each other and engage in each other in the closed configuration, wherein the wire or the insulated wire segment is correspondingly deformed or bent during the transfer from the open configuration into the closed configuration. The connector-body and the cover-element strain relief structures can be configured in a fundamentally known way, for example in each case in the form of a corrugated structure. In further embodiments, the connector-body and the cover-element clamping structures may not be strictly complementary with each other and instead are formed in each case, for example, by a roughening or a number of pimples or the like which engage in an insulation.

In one embodiment, the channel bottom opens out at a distal channel end in an end socket. The end socket is designed to receive an end section, extending from the wire end, of the uninsulated wire segment, wherein the end socket runs at an angle, in particular a right angle, to the channel axis.

The end socket can be formed by a recess, a bore, or a channel which extends from the channel bottom at the distal channel end perpendicularly or at an angle toward the connector body underside. The end socket can be open or closed toward the connector body underside.

In the course of supplying or positioning the wire, the end section is here inserted with the wire end at the front into the end socket in the open configuration of the electrical connector. During the transfer into the closed configuration, the wire, in particular the uninsulated wire segment, is pressed into the channel and thus bent at the transition of the channel bottom to the end socket in accordance with the angle between the channel axis and the end socket, for example is bent at a right angle. This bending prevents the lead-in section from being pulled out of the electrical connector in the closed configuration and thus serves as a pull-out safety device.

If the end socket is closed toward the connector body underside and is designed, for example, as a blind hole, the bottom or base of the end socket can serve at the same time as a wire stop. In this case, the wire is inserted into the end socket until the wire end abuts the bottom or base of the blind hole. The same can be achieved, in the case of an end socket extending in principle as far as the connector body underside, by a step or a shoulder.

In one embodiment, the metallization electrically connects the wire contact surface and the electrical connection surface through a perforation in the connector body. In such an embodiment, the metallization completely or partially covers one or more inner walls of the perforation. The perforation can extend in the connector body base from the channel bottom to the connector body underside. Alternatively or additionally, that part of the metallization which connects the wire contact surface and the electrical connection surface may also run outside or on an outer surface of the connector body.

In one embodiment, the connector body may have an electrical connection structure, wherein the electrical connection surface is arranged at least partially on the electrical connection structure. The electrical connection structure can be formed in particular by one or more convex elements such as electrical connection pins or electrical connection studs. Electrical connection pins or electrical connection studs can be arranged, for example, on the otherwise essentially plane connector body underside and can protrude therefrom. When the electrical connector is mounted, the electrical connection pins can be inserted into in each case a corresponding bore or depression. Instead of or in addition to the connector body underside, the electrical connection structure can, however, also be arranged, for example, on one or both lateral connector body sides.

In one embodiment, positioning and connecting structures in the form of convex or protruding positioning elements such as positioning pins, positioning studs, or positioning webs or positioning ribs may be provided. In one embodiment, a number of positioning elements may extend along or parallel to the connector body axis or channel axis and protrude from the connector body underside. During the mounting, they can ensure a defined direction of the connector or channel axis. In one embodiment, one or more positioning elements may serve at the same time as an electrical connection structure as described above. It is true for both an electrical connection structure and positioning elements as a whole that they can optionally also be formed completely or partially by negative features such as depressions and recesses into which corresponding convex mating elements such as positioning pins or positioning webs or positioning ribs or positioning studs engage during mounting.

In one embodiment, the cover element may have guide elements, wherein the guide elements project in the closed configuration from the connector body top side on both sides of the channel axis into the connector body.

Guide elements can be arranged in pairs on both sides of and symmetrically with respect to the cover element axis, and a number of guide elements can be arranged one behind the other along the cover element axis and optionally be spaced apart from one another. The clearance or spacing in the lateral direction in the case of a pair of guide elements is here in each case dimensioned such that it corresponds to or is slightly larger than the wire diameter such that the wire can run between them with a small amount of play. The guide elements can, in particular, be arranged along the cover element axis in a region which corresponds to the uninsulated wire segment in the closed configuration or can be designed to guide the uninsulated wire segment. The guide elements ensure that the wire or its lead-in section is guided in a plane during the transfer from the open configuration into the closed configuration, or does not break loose laterally, i.e., transversely to the channel axis.

The guide elements can, as described above for the clamping structure, protrude from the cover element base and be formed, for example, as pins, webs, or tongues. The guide elements can be arranged in the lateral direction in pairs on both sides of the clamping structure.

The connector body can have equivalent corresponding concave guide element sockets such as recesses and/or bulges or relieved portions of the channel side faces, into which the guide elements engage during transfer from the open into the closed configuration.

The guide elements can moreover protrude further from the cover element base than the clamping structure. In this way, during the transfer from the open into the closed configuration, they first come into engagement with their guide element sockets and thus ensure a defined movement of the cover element and counteract, for example, jamming, tipping, or tilting. Depending on the embodiment, this function can be provided in addition or as an alternative to guiding the wire or its lead-in section.

In one embodiment, elements of a latching structure as described above may serve as guide elements and guide element sockets.

In one embodiment, the electrical connector may have a stripping device, in particular a stripping blade. A stripping blade can, for example, be molded as a single piece on the cover element or form a part of the cover element. The stripping blade can be implemented, for example, by a ridge or a correspondingly formed sharp edge of the cover-element latching structure as described above. Such a stripping device serves to strip the wire, here typically by hand, or to remove the insulation in the region of the stripped wire segment. However, a stripping device can in principle also be molded on the connector body or form part of the connector body. The integration of a stripping device into the electrical connector here has the advantage that there is no need for a separate tool to be supplied or carried along for the stripping, this being advantageous, in particular, in the case of use in the field.

DETAILED DESCRIPTION

Figure 1:
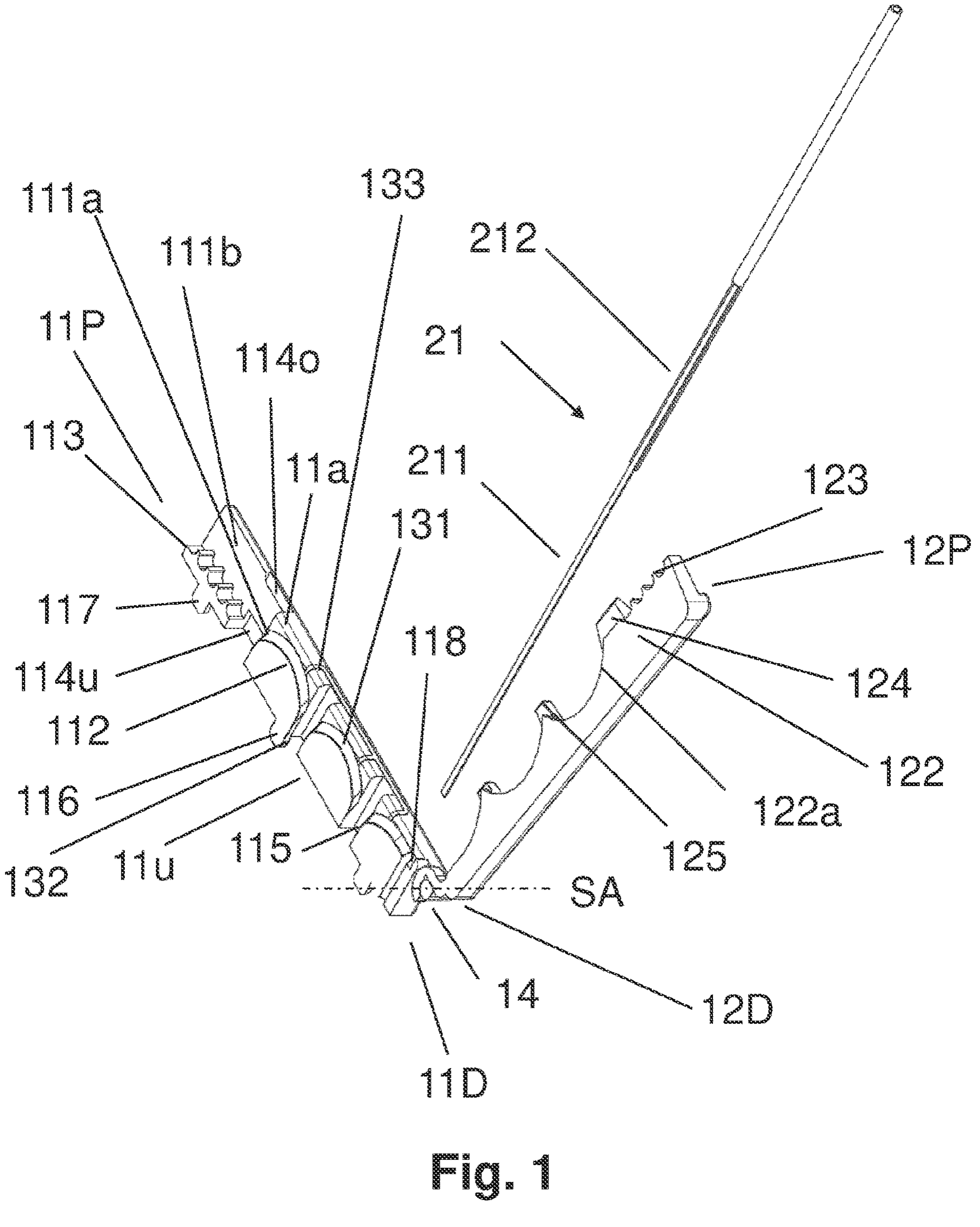
FIG. 1 shows a perspective view of an electrical connector in an open configuration, together with a wire in an initial state in a longitudinal cross-section.

Embodiments of the present disclosure will be described in detail below with additional reference to the Figures. For reasons of clarity, not all the features in all the Figures are here provided with reference signs. Likewise, the same or corresponding features which are present multiple times are not necessarily provided in each case individually with reference signs.

A proximal and a distal direction are designated by P and D, respectively. In addition, a Cartesian coordinate system with coordinate axes x, y, z (FIG. 2) is provided, wherein a direction from proximal to distal corresponds, for example, to the positive x direction.

A hinge axis is designated by SA (FIG. 1), wherein its direction corresponds, for example, to the direction of the z axis or is parallel to it and at the same time defines the lateral direction. A channel axis is designated by KA and a cover element axis by GA and a wire axis by DA (each in FIG. 2). In the illustration shown, the y axis of the coordinate system moreover designates the depth direction.

The structure of an electrical connector 1 will be described below first, in particular, with the aid of FIGS. 1, 2, wherein a section of a wire 2 with a lead-in section 21 is additionally illustrated. An elongated connector body 11 extends from a proximal connector body side 11P in a distal direction to a distal connector body side 11D. The electrical connector 1 is, for example, mirror symmetrical, wherein a connector body axis (not indicated separately) corresponding to the channel axis KA runs in the mirror plane which is perpendicular to the lateral direction. Moreover, the mirror plane runs through the cover element axis GA of a cover element 12.

In a side view, the connector body 11 has, for example, an essentially rectangular shape. A front view along the channel axis KA is, for example, likewise essentially rectangular or square such that an elongated cuboid shape results overall. Other embodiments are also possible.

The connector body 11 here has an essentially smooth or plane connector body underside 11*u* and a connector body top side 110 parallel thereto, as well as lateral connector body sides 11*b* parallel to each other. The lateral connector body sides 11*b* or their outer faces are also smooth or plane in the example shown such that, if required, a plurality of electrical connectors 1 or connector bodies 11 can be arranged in a row, side by side.

A channel 111 extends from the connector body top side 110 in the depth direction in the direction of the connector body underside 11*u* into the connector body 11. The channel 111 has an open channel top side 1110 which serves to insert the wire 2 or a lead-in section 21 thereof as described below. The channel 111 is delimited laterally by two channel side faces 111*b*. The channel 111 extends along a channel axis KA which coincides with the connector body axis in the example shown. The channel 111 moreover has a channel bottom 111*a* which is arranged between the channel side faces 111*b* and connects the latter. A perpendicular spacing between the open channel top side 1110 and the channel bottom 111*a* specifies a channel depth which, in the example shown, varies along the channel axis KA as described below. A lateral spacing transverse to the channel axis KA corresponds to the channel 111 width which, in the example shown, also varies along the channel axis KA. The channel bottom 111*a* is moreover not continuous in the example shown along the channel axis KA and instead has interruptions or openings to the connector body underside 11*u*. The channel side faces 111*b* produce, together with the channel bottom 111*a*, an essentially U-shaped channel cross-section.

At a distal channel end, the channel bottom 111*a* opens into a blind hole 118, extending in the direction of the connector body underside 11*u*, as an end socket and wire stop. The blind hole 118 here extends, for example, from the channel bottom 111*a* perpendicularly to the channel axis KA in the direction of the connector body underside 11*u*. A through hole can also be provided as an alternative to a blind hole.

A cover element 12 of the electrical connector 1 has, in the embodiment shown, a cover element base 126 in the form of a flat rectangular plate or a lid. A top view of the cover element 12 corresponds, for example, essentially to the top view of the connector body 11. The cover element 12 extends from a proximal cover element side 12P along a cover element axis GA to a distal cover element side 12D.

The connector body 11 and the cover element 12 are, in the embodiment shown, connected by a hinge 14 at their respective distal sides 11D, 12D, wherein the hinge axis SA runs in a lateral direction. The cover element 12 can be pivoted about the hinge axis relative to the connector body 11.

The connector body 11 and the cover element 12 are, for example, designed as two separate components, wherein the connector body 11 and the cover element 12 are each a typically injection-molded plastic part. A hinge part of the hinge 14 is here designed as integral with the connector body 11 and the other hinge part as integral with the cover element 12. In principle, however, the connector body 11 and the cover element 12 can also be designed as a single piece together with the hinge 14. In this case, the hinge 14 is implemented, for example, as a film or foil hinge. In an alternative embodiment, the connector body 11 and the cover element 12 can also be separate parts with no hinge, wherein the cover element is, for example, placed onto the connector body in order to transfer from the open into the closed configuration.

The cover element 12 has a clamping structure with, for example, three curved segments 122*a* which are arranged one behind the other along the cover element axis GA and are together designed as a web 122. The web 122 width transverse to the channel axis or in a lateral direction is here slightly narrower than the channel width such that the web 122 can be plunged into the channel 111 from the open channel top side 1110. The connector body 11 has, along the connector body axis or channel axis KA, a mating clamping structure which, for each curved segment 122*a* of the clamping structure, comprises a corresponding complementary element in the form of a curved segment 112. The curved segments 112 here each form a part of the channel bottom 111*a*.

In the embodiment shown, the curved segments 112 meet the channel side faces 111*b* at an angle such that the channel bottom 111*a* has a V-shaped cross-section in the region of the curved segments 112.

Guide elements, in the form of guide tongues 125 with, for example, a rectangular cross-section, which are each situated in pairs opposite each other with respect to the cover element axis GA are arranged along the cover element axis GA between the curved segments 122*a* or at the boundary between successive curved segments 122*a*. The guide tongues 125, like the clamping structure or the web 122 forming the curved segments 122*a*, protrude perpendicularly from the cover element base 126. The guide tongues 125 here protrude further than the curved segments 122*a* or protrude beyond them.

For each guide tongue 125, the connector body 11 has a corresponding guide element socket or guide tongue socket 115 in order to receive the guide tongues 125. The guide tongue sockets 115 are implemented by socket recesses which in this embodiment are continuous in the depth direction or between the connector body top side 11*a* and the connector body underside 11*u*, on the inner sides of the connector body side walls 11*a* or lateral bulges of the channel 111. As a result, the channel bottom 111*a* is also interrupted along the channel axis KA in each case between the curved segments 112 of the mating clamping structure.

The electrical connector 1 moreover has a latching device. The latching device comprises a cover-element latching structure which are implemented by catches 124 which are resilient in the lateral direction or transversely to the cover element axis GA. The resilient catches 124 protrude from the cover element base 126 in a similar fashion to the guide tongues 125 and, like the latter, are arranged in pairs on both sides of the cover element axis GA. The catch faces of the resilient catches 124 are directed outward or away from the cover element axis GA. The inner sides, facing each other, of the resilient catches 124 have a clearance relative to each other such that they can hold the uninsulated wire or the uninsulated wire segment 211 between them but not the insulated wire segment 212 such that they can serve at the same time as a wire stop.

In order to receive the resilient catches 124, the connector body 11 has an upper catch socket 1140 and a lower catch socket 114*u* for each of the two resilient catches 124. The upper catch sockets 1140 are here open to the connector body top side 110, and the lower catch sockets 114*u* are open to the connector body underside 11*u* such that the channel bottom 111*a* is interrupted in the region of the catch sockets 1140, 114*u*. The upper and lower catch sockets 1140, 114*u* are here each implemented by a recess on the inner sides of the connector body side walls 11*a*, wherein the upper catch socket 1140 and the lower catch socket 114*u* are each not continuous relative to each other. The upper and lower catch sockets 1140, 114*u* together form a connector-body latching structure. If the electrical connector 1 is to be designed in such a way that it can be transferred from the closed back into the open configuration, the resilient catches 124 can be elastically deformed inward in the lateral direction from below, for example by a tool such as a correspondingly designed pair of pliers, such that they can be released from the lower catch sockets 114*u*. Moreover, for this purpose, corresponding perforations can optionally, alternatively or additionally, be provided in the connector body side walls 11*a*.

The connector body 11 moreover has a strain relief with a connector-body strain relief structure 113 a cover-element strain relief structure 123 complementary therewith which engage in each other in the closed configuration. The connector-body strain relief structure 113 here forms a proximal part of the channel bottom 111*a*. The resilient catches are arranged following the cover-element strain relief structure 123 in the distal direction, and the catch sockets 1140, 114*u* are arranged following the connector-body strain relief structure 113 in the distal direction D.

A partial metallization 13 is applied to the connector body 11. The metallization 13 here covers the channel bottom 111*a*, in particular in the region of the base-shaped segments 112 of the mating clamping structure, as a result of which a wire contact surface 131 is jointly formed. The individual segments or sections of the wire contact surface 131 (corresponding to the curved segments 112 of the mating clamping structure) are here connected via a connecting conductor 133 which also forms part of the partial metallization 13. The connecting conductor 133 is routed in this embodiment via the channel side faces 111*b* and the connector body top side 110.

Protruding from the connector body underside 11*u*, the connector body 11 moreover has a number of, for example three, positioning pins 117 arranged along the connector body axis. One of the positioning pins 117, for example the middle one, at the same time serves as an electrical connection pin 116 in the embodiment shown. For this purpose, the metallization 13 is routed via the inner wall of an adjoining guide tongue socket 115 to the outer surface of the electrical connection pin 116, as a result of which the metallization 13 forms an electrical connection surface 132 on the electrical connection pin 116. When the positioning pins 117, and in particular the electrical connection pin 116 are received in corresponding bores, for example of a printed circuit board or an assembly, the electrical connection surface 132 can be electrically contacted, for example, by soldering or clamping the electrical connection pin 116.

A method for electrically connecting the wire 2 will be explained below with additional reference to FIGS. 3, 4, 5, 6, 7. The lead-in section 21 of the wire 2 here has an insulated wire segment 112 and an adjoining uninsulated wire segment 211, wherein the uninsulated wire segment 211 terminates in a wire end 22 as an end face. Although not obligatory, the wire 2 is here received with a round cross-section or rotational symmetry about the wire axis DA.

Figure 2:
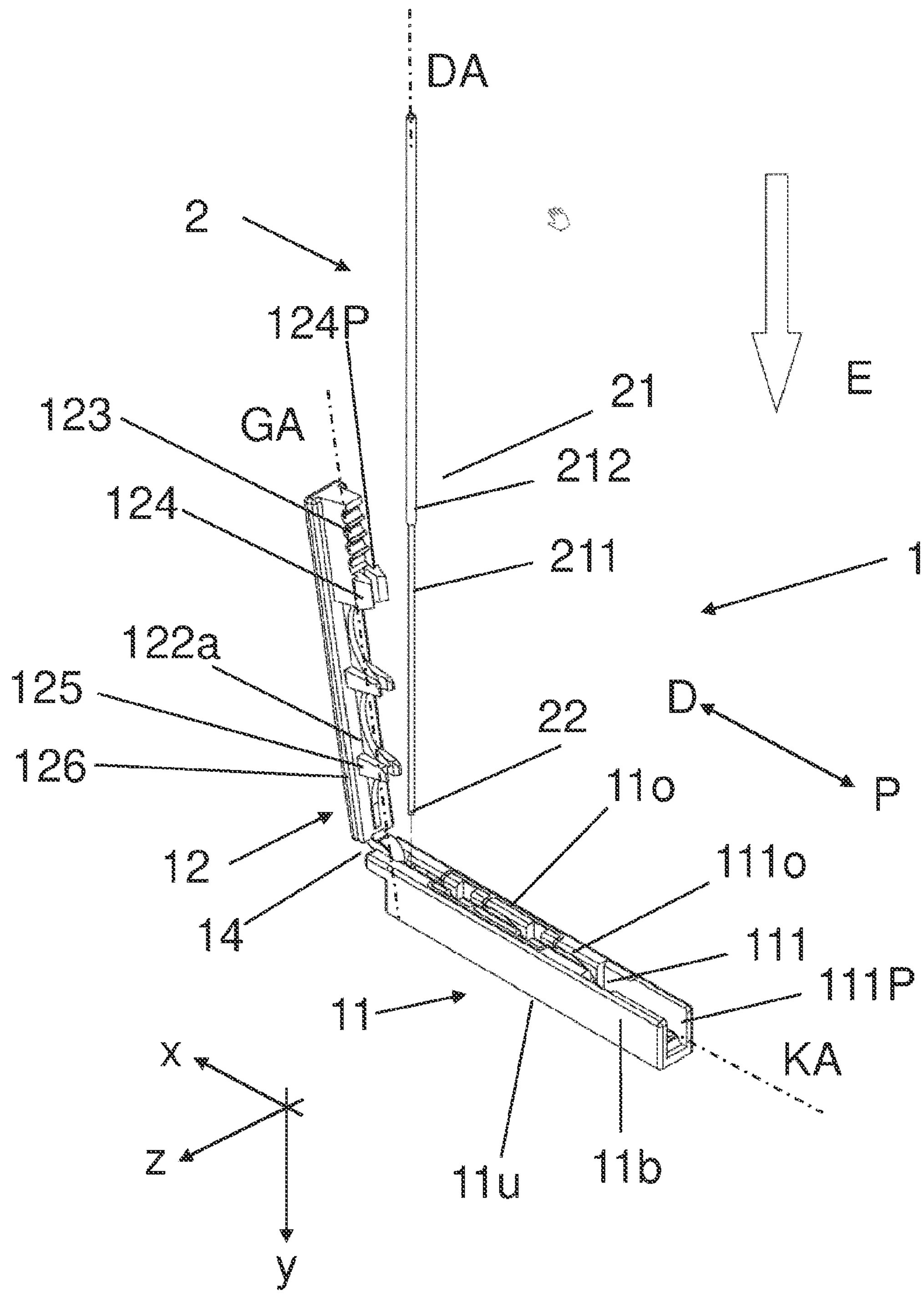
FIG. 2 shows an illustration, corresponding to FIG. 1, with an electrical connector not shown in cross-section.
Figure 3:
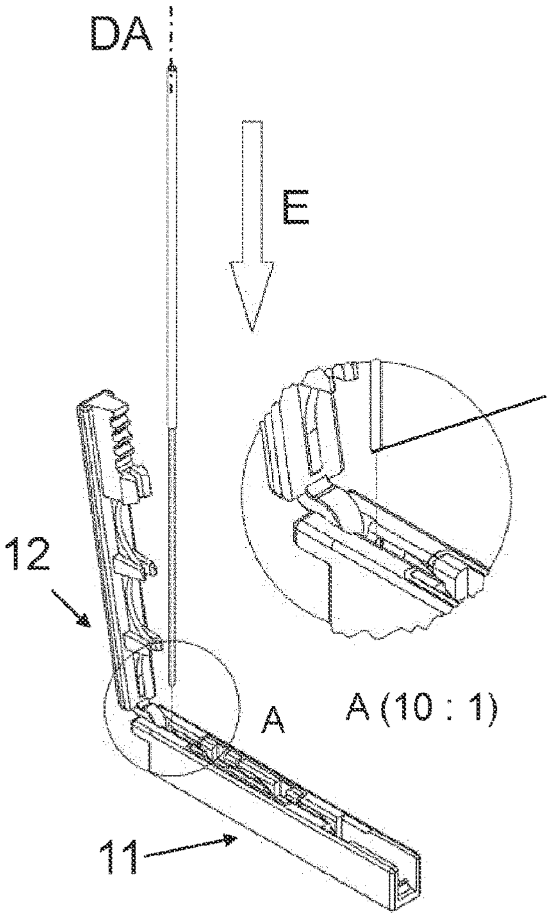
FIG. 3 shows a distal detailed view corresponding to FIG. 2.

As shown in FIGS. 1, 2, 3, the wire 2 is positioned or supplied such that its wire axis DA is aligned with the axis of the blind hole 118 and its end section 23 is inserted in the insertion direction E into the blind hole 118 with the wire end 22 at the front until the wire end 22 abuts its bottom serving as a wire stop.

The electrical connector 1 is here situated in the open configuration and the wire 2 or its lead-in section 21 extends, after insertion of the end section 23 into the blind hole 118, essentially perpendicularly to the connector body top side 110.

Moreover, the wire 2 and the cover element 12 are positioned relative to each other such that the uninsulated wire segment 211 lies respectively between the resilient catches 124, situated opposite each other along the cover element axis GA, and guide tongues 125.

Removal of the insulation in the uninsulated wire segment 211 can take place in advance using a separate tool or stripping device, integrated into the electrical connector or molded on, as described above. Moreover, the wire can be already supplied in a corresponding prefabricated form.

Figure 4:
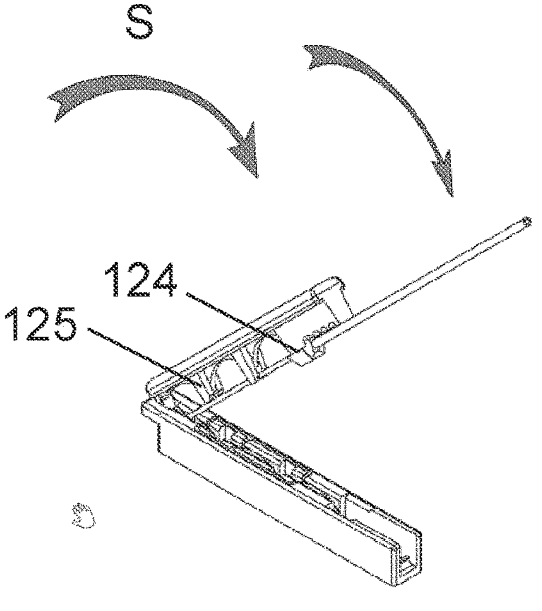
FIG. 4 shows the electrical connector with a wire according to FIG. 1 in an intermediate state during the transfer from the open configuration into a closed configuration.

Next, the electrical connector 1 is transferred from the open configuration into the closed configuration, this taking place by a pivoting movement of the cover element 12 about the hinge axis SA with a pivoting direction S onto the connector body 11 (FIG. 4). The wire end 22 is thus fastened or fixed in the blind hole 118 and the wire is bent by the cover element 12 at the transition between the blind hole 118 and the channel bottom 111*a*.

Figure 5:
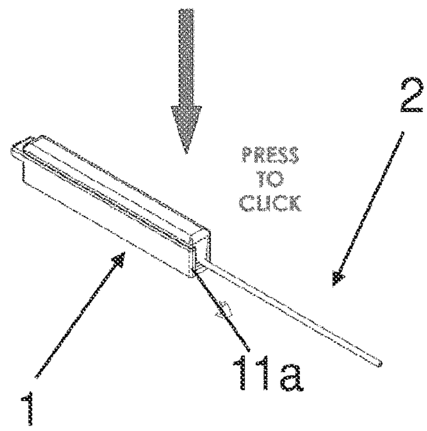
FIG. 5 shows the electrical connector with a wire according to FIG. 1 in an end state after the closed configuration is reached.
Figure 6:
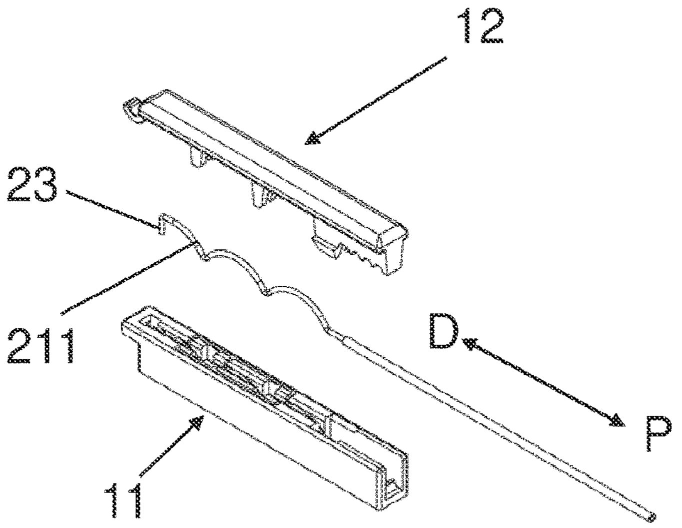
FIG. 6 shows the electrical connector and wire according to FIG. 1 in the closed configuration in a perspective view as an exploded illustration.
Figure 7:
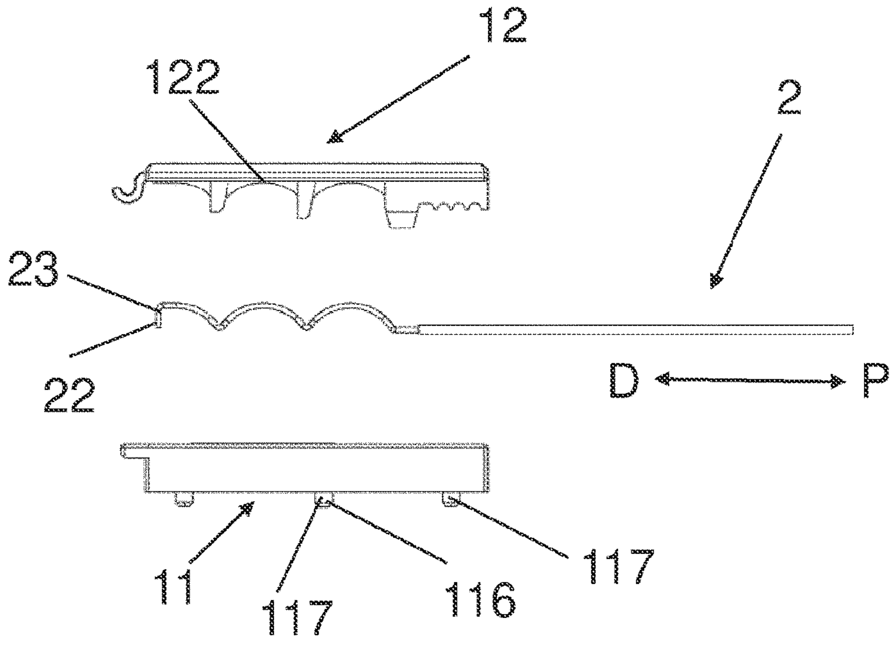
FIG. 7 shows a side view corresponding to FIG. 6.

When the pivoting movement continues, the cover element 12 finally comes to lie on the connector body 11 or its connector body top side 110 (FIG. 5). The uninsulated wire segment 211 is thus deformed in the course of the pivoting movement between the curved segments 122*a* of the clamping structure and the curved segments 112 of the mating clamping structure such that a corrugated profile results in the region of the uninsulated wire segment 211 (FIGS. 6, 7).

Also, in the course of the pivoting movement, the guide tongues 125 are plunged from the connector body top side 110 into the guide tongue sockets 115 and, in a last stage shortly before reaching the closed configuration, the resilient catches 124 are plunged first into the respective upper catch sockets 1140. The resilient catches 124 are first elastically deformed laterally inward or toward the cover element axis GA by virtue of an edge at the transition from the upper catch sockets 1140 to that part of the channel side face 111*b* situated between the upper catch sockets 1140 and the lower catch sockets 114*u*. At the transition into the respective lower catch sockets 114*u*, the resilient catches 124 spring back outward in a lateral direction, wherein each resilient catch 124 latches into the associated lower catch socket 114*u* such that the cover element 12 is locked to the connector body 11. The latching or locking is here associated with audible acoustic feedback, in particular a click, which marks the final state or when the closed configuration is reached.

In this state, the insulated wire segment 212 is also held and clamped between the connector-body strain relief structure 113 and the cover-element strain relief structure 123, and the lead-in section 21 of the wire 2 is inserted completely in the channel 111. As can be seen in FIG. 5, the wire 2 protrudes from the channel 111 at the proximal connector body side 11P.

By virtue of the locking of the connector body 11 and the cover element 12, the uninsulated wire segment 211 is firmly clamped between the curved segments 122*a* of the clamping structure and the curved segments 112 of the mating clamping structure or the channel bottom 111*a* and secure contact pressure of the uninsulated wire segment 211 with the wire contact surface 131 is thus ensured.

In the closed configuration of the electrical connector 1, the proximal end sides 124P of the resilient catches 124 moreover serve as a wire stop. If a through hole is provided instead of the blind hole 118, the end sides 124P serve as a wire stop also for initially positioning the wire. If the blind hole 118 is present, it is optionally possible to omit a wire stop using the resilient catches 124 or their proximal end sides.

The whole sequence can be performed by a user using just one hand and is thus as far as possible error-proof. It is particularly advantageous if the transfer of the electrical connector from the open into the closed configuration and hence the electrical connection of the wire 2 takes place with a single movement, namely the pivoting movement of the cover element 12.

It will be appreciated that aspects of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electrical connector for a wire with a wire end, wherein an uninsulated wire segment extending from the wire end and an insulated wire segment adjoining the uninsulated wire segment together form a lead-in section, wherein the electrical connector can be transferred from an open configuration into a closed configuration, the electrical connector comprising:

a connector body with a proximal connector body side and a distal connector body side, a connector body top side, and a connector body underside, wherein the connector body has a channel for receiving the lead-in section, wherein the channel extends in the connector body along a channel axis from a proximal channel end in a distal direction, wherein the proximal channel end opens out into the proximal connector body side, wherein the channel has a channel top side open toward the connector body top side, and a channel bottom, and wherein the connector body is formed from electrically insulating material;

an electrical connection element, wherein the electrical connection element has a wire contact surface arranged in the channel for the purpose of contacting the uninsulated wire segment and an electrical connection surface arranged on an outside of the connector body underside of the connector body, wherein the electrical connection element is formed by metallization of the connector body such that the electrical connection element is provided in the form of a metallic layer or coating on the connector body; and a cover element, wherein the cover element has a clamping structure, wherein the clamping structure does not project into the channel in the open configuration and projects into the channel from the open channel top side in the closed configuration, and is configured to clamp the lead-in section between the channel bottom and the clamping structure in the closed configuration and to hold the uninsulated wire segment in contact with the wire contact surface.

2. The electrical connector according to claim 1, wherein the connector body and the cover element are formed as a single piece.

3. The electrical connector according to claim 1, wherein the connector body and the cover element are connected by a hinge, wherein the hinge pivotably connects the distal connector body side and a distal cover element side, and has a hinge axis oriented transversely to the channel.

4. The electrical connector according to claim 1, wherein the electrical connector further comprises a latching device, wherein the latching device comprises a connector-body latching structure arranged on the connector body and a cover-element latching structure arranged on the cover element, wherein the connector-body and cover-element latching structures are designed to lock in latching fashion the connector body and the cover element together by positive engagement of the connector-body and cover-element latching structures.

5. The electrical connector according to claim 1, wherein the electrical connector has a wire stop for axially positioning the lead-in section of the wire with respect to the connector body of the electrical connector.

6. The electrical connector according to claim 1, wherein the channel bottom and the clamping structure are configured to deform the uninsulated wire segment during the transfer from the open configuration into the closed configuration.

7. The electrical connector according to claim 6, wherein the channel bottom and the clamping structure are configured to form a number of curved sections in the uninsulated wire segment along the channel axis.

8. The electrical connector according to claim 1, wherein the wire contact surface runs at least partially on the channel bottom.

9. The electrical connector according to claim 1, wherein the wire contact surface comprises a plurality of contact surface segments which are electrically connected to one another by a connecting conductor of the metallization.

10. The electrical connector according to claim 1, wherein the electrical connector has a strain relief provided in the connector body of the electrical connector.

11. The electrical connector according to claim 1, wherein the channel bottom at a distal channel end includes an end socket, wherein the end socket is configured to receive an end section, extending from the wire end, of the uninsulated wire segment, wherein the end socket runs at an angle to the channel axis.

12. The electrical connector according to claim 1, wherein the metallization electrically connects the wire contact surface and the electrical connection surface through a perforation or a plurality of perforations in the connector body.

13. The electrical connector according to claim 1, wherein the connector body has an electrical connection structure provided at the connector body underside of the connector body, wherein the electrical connection surface is arranged at least partially on the electrical connection structure.

14. The electrical connector according to claim 1, wherein the cover element has guide elements, wherein the guide elements project in the closed configuration from the connector body top side on both sides of the channel axis into the connector body.

15. A connector/wire arrangement, comprising:

an electrical connector according to claim 1; and a wire with a wire end, wherein an uninsulated wire segment extending from the wire end and an insulated wire segment adjoining the uninsulated wire segment together form a lead-in section, wherein the lead-in section is received in the channel.

16. The electrical connector according to claim 1, wherein the electrical connection is formed by a partial metallization of the connector body.

17. The electrical connector according to claim 11, wherein the end socket runs at a right angle to the channel axis.

18. The electrical connector according to claim 13, wherein the connector body has at least one protruding electrical connection pin, and wherein the electrical connection surface is arranged at least partially on the at least one protruding electrical connection pin.

19. A method for electrically connecting a wire, the method comprising:

providing an electrical connector in an open configuration, and a wire with a wire end, wherein an uninsulated wire segment extending from the wire end and an insulated wire segment adjoining the uninsulated wire segment together form a lead-in section, and wherein the connector includes:

a connector body with a proximal connector body side and a distal connector body side, a connector body top side, and a connector body underside, wherein the connector body has a channel, wherein the channel extends in the connector body along a channel axis from a proximal channel end in a distal direction, wherein the proximal channel end opens out into the proximal connector body side, wherein the channel has a channel top side open toward the connector body top side, and a channel bottom, and wherein the connector body is formed from electrically insulating material;

an electrical connection element, wherein the electrical connection element has a wire contact surface arranged in the channel for the purpose of contacting the uninsulated wire segment and an electrical connection surface arranged on an outside of the connector body underside of the connector body, wherein the electrical connection element is formed by metallization of the connector body such that the electrical connection element is provided in the form of a metallic layer or coating on the connector body; and a cover element, wherein the cover element has a clamping structure, wherein the clamping structure does not project into the channel in the open configuration and projects into the channel from the open channel top side in a closed configuration, and is configured to clamp the lead-in section between the channel bottom and the clamping structure in the closed configuration and to hold the uninsulated wire segment in contact with the wire contact surface; and transferring the electrical connector from the open configuration into the closed configuration, as a result of which the lead-in section is inserted into the channel and clamped between the clamping structure and the channel bottom and the uninsulated wire segment is brought into contact with the wire contact surface.

* * * * *